United States Patent [19]
Bernard et al.

[11] 4,151,581
[45] Apr. 24, 1979

[54] SPACER-ELECTROLYTE COMPOSITE IN ELECTROLYTIC CAPACITORS

[75] Inventors: Walter J. Bernard; Sidney D. Ross, both of Williamstown, Mass.

[73] Assignee: Sprague Electric Company, North Adams, Mass.

[21] Appl. No.: 821,850

[22] Filed: Aug. 4, 1977

[51] Int. Cl.² .............................................. H01G 9/00
[52] U.S. Cl. ................................................. 361/433
[58] Field of Search ........................ 361/433; 29/570

[56] References Cited
U.S. PATENT DOCUMENTS

| | | | |
|---|---|---|---|
| 2,209,770 | 7/1940 | Evers et al. | 361/433 |
| 3,846,404 | 11/1974 | Nichols | 260/230 |
| 3,908,157 | 9/1975 | Ross et al. | 361/433 |
| 3,940,667 | 2/1976 | Pearce | 361/433 |

*Primary Examiner*—Stanley D. Miller, Jr.
*Assistant Examiner*—James W. Davie
*Attorney, Agent, or Firm*—Connolly and Hutz

[57] ABSTRACT

An electrolytic capacitor contains as a spacer-electrolyte a polymer-liquid electrolyte composite. The composite contains the electrolyte as internal liquid phase and is preferably made of cellulose triacetate. Such a composite has high electrical porosity and reduces the equivalent series resistance of the capacitor.

7 Claims, 1 Drawing Figure

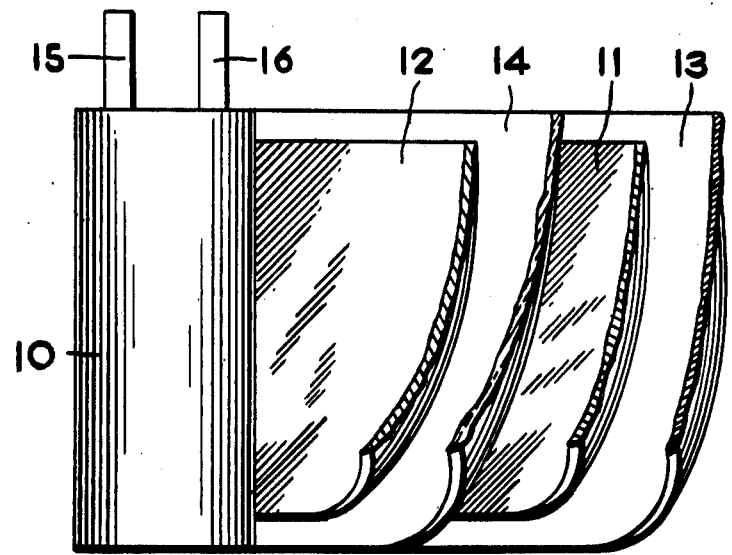

SPACER-ELECTROLYTE COMPOSITE IN ELECTROLYTIC CAPACITORS

BACKGROUND OF THE INVENTION

The invention relates to a spacer-electrolyte composite for electrolytic capacitors. More particularly, it relates to a porous film or membrane of controlled pore size which is filled with and contains the electrolyte. The composite may be a separate entity or may be cast on one or both sides of an electrode foil, preferably the cathode foil.

Typically, a wet liquid-type DC electrolytic capacitor includes at least one anode foil strip and at least one cathode foil strip separated by spacer strips, often paper, wound convolutely into a relatively tight roll. The spacer is impregnated with electrolyte, before or after rolling. In an AC capacitor, two anodes are used, separated by the spacer which is impregnated by electrolyte.

Spacers are used to keep the electrodes from directly contacting each other, and, when impregnated with electrolyte, they provide a conductive path. The more porous a spacer material is, the less resistance there will be to current flow through it. Similarly, the thinner a spacer is, the less resistance is offered. Low resistance is most desirable, particularly in AC capacitors, because of resistance heating. Various papers and plastic films have been used because they have the required tensile strength for winding even when thin. However, research has continued to find more porous materials so that series resistance may be reduced further. Such reduction by increase in porosity for porous polypropylene film vs. kraft paper is described by Ross et al in U.S. Pat. No. 3,908,157 issued Sept. 23, 1975. An ultramicroporous material made of cellulose triacetate and filled with liquid has been developed by Nichols and is described in U.S. Pat. No. 3,846,404 issued Nov. 5, 1974 and in U.S. Pat. No. 4,029,726 issued June 14, 1977, which also covers such structures made from specified cellulose nitrates, cellulose propionates, and cellulose acetate-cellulose nitrate mixtures. Details on the variation in properties with variation in composition and the exchange of the liquid phase are described in these patents.

These materials are described as polymer-liquid composites and are called Poroplastic ®, a registered trademark of Moleculon Research Corporation, Cambridge, MA.

SUMMARY OF THE INVENTION

It is an object of this invention to provide in an electrolytic capacitor a spacer with improved porosity.

It is a further object of this invention to provide a spacer-electrolyte composite which provides reduced resistivity in a capacitor.

The microporous cellulose material mentioned above can hold electrolyte somewhat as a sponge. When wound between electrode foils, this material permits greater contact between the foils and the electrolyte because of its high porosity and hence provides lower resistance. Resistance can be decreased also by casting the material on one of the electrodes, preferably the cathode, so that it does not have to be self-supporting or have the tensile strength required for winding. When the liquid phase of such films are exchanged with usual capacitor electrolytes, the resulting composites exhibit electrical porosities as high as 80%. By comparison, Manila paper has a porosity of about 30%, and other common spacer materials, about 10%.

BRIEF DESCRIPTION OF THE DRAWING

Referring now to the appended drawing in which capacitance section 10 is shown in a partly unrolled condition, anode 11 is of aluminum or tantalum having on its surface an insulating oxide layer. Cathode 12 may also be made of aluminum or tantalum and is preferably etched. Alternately, for an AC capacitor, foil 12 would also be an anode having an insulating oxide on its surface. The spacer films 13 and 14 are polymer-electrolyte composite films preferably of cellulose triacetate containing as liquid-phase the desired electrolyte, e.g., a glycol-borate, a methyl cellosolve, a methyl cellosolve-glycol mixture, or a butyrolactone electrolyte. Tabs 15 and 16 are connected to electrodes 11 and 12 respectively to function as terminals for capacitance section 10.

DESCRIPTION OF THE PREFERRED EMBODIMENTS

Poroplastic ® film containing electrolyte as its internal phase is the preferred spacer material and is cut into strips of the desired width. The electrolyte-filled spacer strips are then wound between aluminum or tantalum electrode foils by known means to form a wound capacitor body. If desired, the internal phase may not be exchanged with electrolyte until after the foils and spacers have been wound into the rolled structure, but it is preferred to do it prior to the winding.

In another embodiment, the film may be cast directly onto the foil and preferably both sides of a cathode foil. If etched aluminum foil is used as cathode, it is preferred to exchange the internal phase for another liquid, notably electrolyte, at this stage. The casting may be carried out on foils of the final desired width or on wider sections which may be slit to the desired width. Since the spacer is on the cathode foil, the latter is wound with its respective anode into the rolled capacitor structure.

The capacitors are then assembled as usual and may, when desirable, have fill electrolyte added to the cans or housing to serve as reservoir electrolyte to keep the filled spacer moist.

In the examples below, a commercial glycol-borate electrolyte was used to impregnate Poroplastic ® cellulose triacetate films. Any electrolyte which is a nonsolvent for these polymer-liquid composites may be used although more than one exchange step may be needed if the electrolyte is immiscible with the liquid-phase of the composite to replace the internal liquid-phase first by a liquid miscible with it and with the electrolyte.

EXAMPLE 1

The table below gives the results of tests comparing 5 samples of 3 mil cellulose triacetate film sold under the trademark Poroplastic ® of Moleculon Research Corp. and filled with a glycol-ammonium pentaborate electrolyte. The data are averages of at least two runs. Comparative data for manila paper are included. Aluminum anodes and cathodes 2 in. wide were used. Capacitance is given in $\mu F$, equivalent series resistance (ESR) in ohms, and leakage current, $I_L$, in mA.

Table I

| Sample # | Thickness (mils) | % Electrical Porosity | 40 Volt Film | | | | | 135 Volt Film | | | | |
|---|---|---|---|---|---|---|---|---|---|---|---|---|
| | | | 120 Hz | | 5 KHz | | $I_L$(mA) (RT,30V) | 120 Hz | | 5 KHZ | | $I_L$(mA) (RT,80V) |
| | | | Cap | ESR | Cap | ESR | | Cap | ESR | Cap | ESR | |
| 1 | 4.2 | 73 | 209 | 0.55 | 193 | 0.32 | 0.08 | 67 | 1.3 | 61 | 0.31 | 0.30 |
| 2 | 3.3 | 78 | 208 | 0.57 | 198 | 0.27 | 0.06 | 73 | 0.84 | 68 | 0.28 | 0.30 |
| 3 | 4.7 | 80 | 210 | 0.55 | 202 | 0.30 | 0.04 | 67 | 0.91 | 63 | 0.36 | 0.24 |
| 4 | 3.8 | 24 | 205 | 1.5 | 85 | 0.94 | 0.20 | 65 | 1.87 | 45 | 0.93 | 0.27 |
| 5 | 4.6 | 42 | 207 | 1.2 | 140 | 0.82 | 0.04 | 59 | 3.6 | 43 | 1.20 | 0.09 |
| Manila (control) | 3.0 | 47 | 207 | 0.86 | 180 | 0.53 | 0.03 | 67 | 1.6 | 59 | 0.61 | 0.07 |

EXAMPLE 2

Another series of capacitors were made in which 0.002-in. thick Poroplastic ® film was deposited directly onto 8-in. wide etched aluminum cathode foil and filled with the same electrolyte used in Example 1. The foil-spacer-electrolyte composite was slit to 2.5-in. widths. The control units contained 3.0 mil Manila paper as spacer and the same electrolyte. Aluminum anodes and cathodes were used. The units were rated at about 230 μF and 30 V. Capacitance is given in microfarads, μF, equivalent series resistance (ESR) in ohms, and leakage current, $I_L$, in microamperes, μA.

Table II

| | 25° C. 120 Hz | | After 900 hrs., 85° C. | | −20° C. 120 Hz | | $I_L$(μA) 25° C. | | After 900 hrs., 85° C. |
|---|---|---|---|---|---|---|---|---|---|
| | Cap | ESR | Cap | ESR | Cap | ESR | Before Aging | After Aging | |
| Test | 237 | 0.67 | 191 | 0.84 | 177 | 3.90 | 59 | 8.4 | 3.4 |
| Control | 224 | 1.12 | 204 | 1.06 | 172 | 9.24 | 37 | 6.0 | 1.4 |
| Ratio (T/C) | 1.06 | 0.60 | 0.94 | 0.79 | 1.03 | 0.42 | — | — | — |

In the examples above, the liquid-phase of the film was ore-exchanged with the electrolyte for evaluation. However, since the internal phase liquid is said to be exchanged rapidly by stepwise replacement with another liquid, the electrolyte exchange could be carried out later in the manufacturing sequence, if desired.

Although the examples show the use of ethylene glycol-ammonium pentaborate electrolyte, other electrolytes, such as methyl cellosolve and methyl cellosolve-ethylene glycol mixtures, may be used providing the electrolytes do not react with the Poroplastic ® film and the materials of the final capacitor. Alternately, other polymer-liquid composites, such as those based on cellulose nitrate-cellulose acetate mixtures, may be used without departing from the spirit of the invention.

What is claimed is:

1. An electrolytic capacitor having a plurality of foil electrodes, a dielectric film on those electrodes which are anodes, and a cellulose triacetate polymer-liquid composite as spacer, said composite containing as internal liquid phase the capacitor electrolyte.

2. An electrolytic capacitor according to claim 1 wherein said electrolyte has been added to said polymer-liquid composite by exchange prior to assembly of the capacitor section.

3. An electrolytic capacitor according to claim 1 wherein said spacer is filled with an electrolyte in which the liquid is a non-solvent for the polymer.

4. An electrolytic capacitor according to claim 3 wherein said electrolyte is a glycol-borate electrolyte.

5. An electrolytic capacitor according to claim 1 wherein said polymer-liquid composite spacer is cast onto at least one side of at least one electrode.

6. An electrolytic capacitor according to claim 5 wherein said electrode onto which said polymer-liquid composite spacer is cast is an aluminum or tantalum foil cathode.

7. An electrolytic capacitor according to claim 6 wherein said foil cathode is etched prior to casting said polymer-liquid composite onto it.

* * * * *